(12) United States Patent
Crawford, Jr. et al.

(10) Patent No.: US 7,752,624 B2
(45) Date of Patent: Jul. 6, 2010

(54) SYSTEM AND METHOD FOR ASSOCIATING WORKLOAD MANAGEMENT DEFINITIONS WITH COMPUTING CONTAINERS

(75) Inventors: Isom Lawrence Crawford, Jr., Royse City, TX (US); Troy Don Miller, Plano, TX (US); Gregory D. Jordan, Fort Collins, CO (US); Francisco Romero, Plano, TX (US); Thomas Edwin Turicchi, Jr., Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1596 days.

(21) Appl. No.: 11/018,684

(22) Filed: Dec. 21, 2004

(65) Prior Publication Data

US 2006/0136928 A1 Jun. 22, 2006

(51) Int. Cl.
*G06F 9/46* (2006.01)
*G06F 17/00* (2006.01)
*H04L 29/06* (2006.01)

(52) U.S. Cl. .......................... 718/104; 726/1

(58) Field of Classification Search ................. 718/104; 707/100
See application file for complete search history.

(56) References Cited

U.S. PATENT DOCUMENTS

2003/0037092 A1  2/2003  McCarthy et al.
2004/0243600 A1* 12/2004  Ikeda et al. ................. 707/100

OTHER PUBLICATIONS

U.S. Appl. No. 11/007,360, filed Dec. 8, 2004.

* cited by examiner

*Primary Examiner*—Meng-Ai An
*Assistant Examiner*—Eric C Wai

(57) ABSTRACT

In one embodiment, a system comprises a plurality of computing containers having processing resources for executing software workloads, a plurality of management processes for controlling access to the processing resources according to workload policy definitions, a data container for storing a plurality of workload policy definitions and associations between the plurality of workload policy definitions and the plurality of computing containers, and a configuration process for communicating workload policy definitions from the data container to the plurality of management processes.

18 Claims, 3 Drawing Sheets

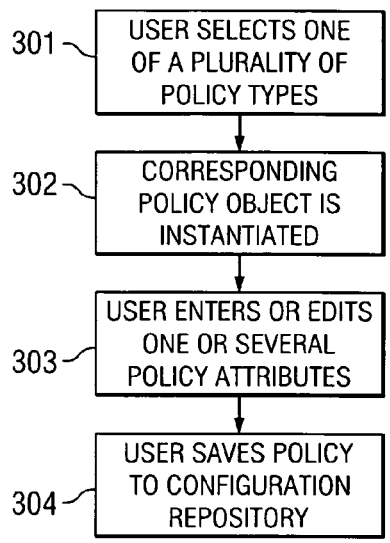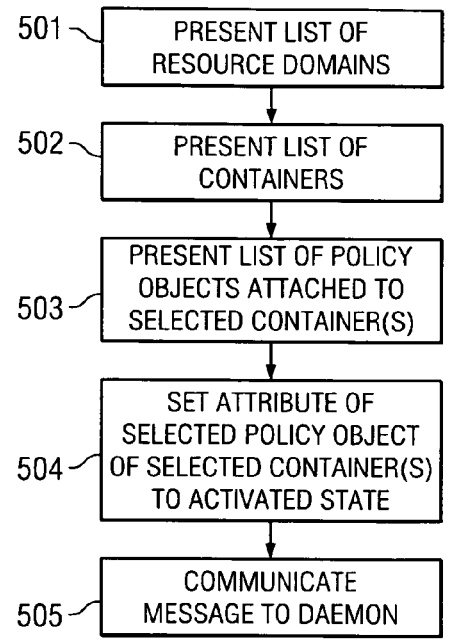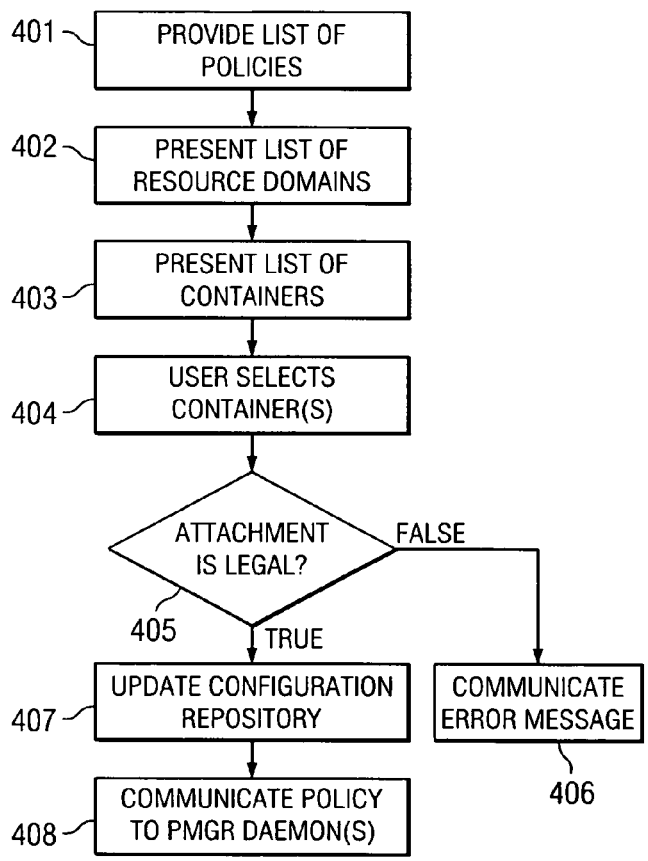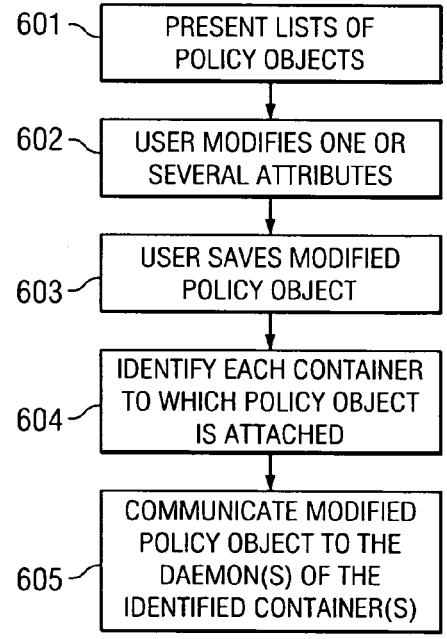

SYSTEM AND METHOD FOR ASSOCIATING WORKLOAD MANAGEMENT DEFINITIONS WITH COMPUTING CONTAINERS

RELATED APPLICATIONS

The present application is related to commonly assigned U.S. patent application Ser. No. 10/206,594 entitled "DYNAMIC MANAGEMENT OF VIRTUAL PARTITION COMPUTER WORKLOADS THROUGH SERVICE LEVEL OPTIMIZATION," filed Jul. 26, 2002, which issued as U.S. Pat. No. 7,140,020 on 2006 Nov. 21 and which is incorporated herein by reference.

TECHNICAL FIELD

The present application is generally related to associating workload management definitions with computer containers.

BACKGROUND

Many enterprises have experienced a dramatic increase in the number of computers and applications employed within their organizations. When a business group in an enterprise deploys a new application, one or more dedicated server platforms are typically added to host the new application. This type of environment is sometimes referred to as "one-app-per-box." As more business processes have become digitized, a "one-app-per-box" environment leads to an inordinate number of server platforms. As a result, administration costs of the server platforms increase significantly. Moreover, the percentage of time that the server platform resources are actually used (the utilization rate) can be quite low.

To address these issues, many enterprises have consolidated multiple applications onto common server platforms to reduce the number of platforms and increase the system utilization rates. When such consolidation occurs, coordination of the resources of the platform between the multiple applications is appropriate. For example, it is desirable to provide a scheduling mechanism that controls access to processor resources by the various threads of the supported applications. Some scheduling mechanisms (e.g., "workload management" functionality) provide a set of shares, rules, priorities, service level objectives, and/or the like to control the scheduling of processes.

One example of workload management involves creating multiple virtual partitions in a shared resource domain. Various resources (such as processors, memory, input/output (IO) resources, and/or the like) are typically assigned to each virtual partition. Also, a respective operating system (OS) image can be executed within each virtual partition. Respective groups of related applications may be executed within each virtual partition. The configuration of the virtual partitions provides a degree of isolation between the groups of applications of the various virtual partitions. Additionally, a workload management process may be executed within each virtual partition to control access to resources within the virtual partitions. Specifically, within a particular virtual partition, the workload management process may schedule access to processor resources between the applications of the group assigned to the virtual partition.

In addition to workload management within virtual partitions, another level of resource management occurs by reallocating resources between the virtual partitions. Specifically, if the workload management process within a virtual partition determines that service level objectives cannot be obtained for the group of applications, the workload management process may request additional resources from a "global" workload management process. Upon the basis of rules, shares, priorities, service level objectives, and/or the like, the global workload management process may shift resources from another virtual partition to the requesting partition. For example, if the other partition has excess resources, those resources can be reassigned to the requesting virtual partition. The use of workload management functionality enables the utilization rates associated with computing resources to be improved. Accordingly, workload management functionality enables a more efficient use of computing resources.

SUMMARY

In one embodiment, a system comprises a plurality of computing containers having processing resources for executing software workloads, a plurality of management processes for controlling access to the processing resources according to workload policy definitions, a data container for storing a plurality of workload policy definitions and associations between the plurality of workload policy definitions and the plurality of computing containers, and a configuration process for communicating workload policy definitions from the data container to the plurality of management processes.

In another embodiment, a method comprises maintaining a data container that includes a plurality of computer container definitions, a plurality of workload management definitions, and associations between the plurality of computing container definitions and the plurality of workload management definitions, operating a plurality of management processes for performing resource allocation operations associated with a plurality of computing containers instantiated according to the plurality of computer container definitions, and communicating changes to the plurality of workload management definitions in the data container to the plurality of management processes.

BRIEF DESCRIPTION OF THE DRAWINGS

FIGS. 3-6 depict flowcharts for performing workload management activities according to some representative embodiments.

DETAILED DESCRIPTION

Although known workload management functionality provides a number of benefits when compared to prior computing environments, known workload management functionality is subject to some limitations. In particular, known workload management functionality controls the dynamic allocation of resources in response to low-level parameters encoded in a respective configuration file for each managed computing container. Additionally, known workload management functionality requires workload management daemons on different OS images to be restarted upon modification of the configuration files to change their operations according to the modified policy parameters. Accordingly, defining and modifying workload management policies are currently relatively complex and error-prone tasks.

Some representative embodiments provide a configuration repository that includes policy objects. The policy objects enable workload management policies to be defined independently of computing containers. The configuration repository further includes resource domain objects and container objects. When policy objects are attached to computing container objects and activated, the corresponding workload management functionality associated with the computing containers dynamically allocates resources according to the policy types and policy metrics defined in the respective policy objects. By adapting workload management functionality, some representative embodiments enable workload policies to be modified and updated on each applicable computing container without imposing a significant burden on an administrator. Moreover, some representative embodiments enable default policies to be stored. The default policies may be efficiently applied by selection of a default policy through a suitable user interface.

Figure 1:
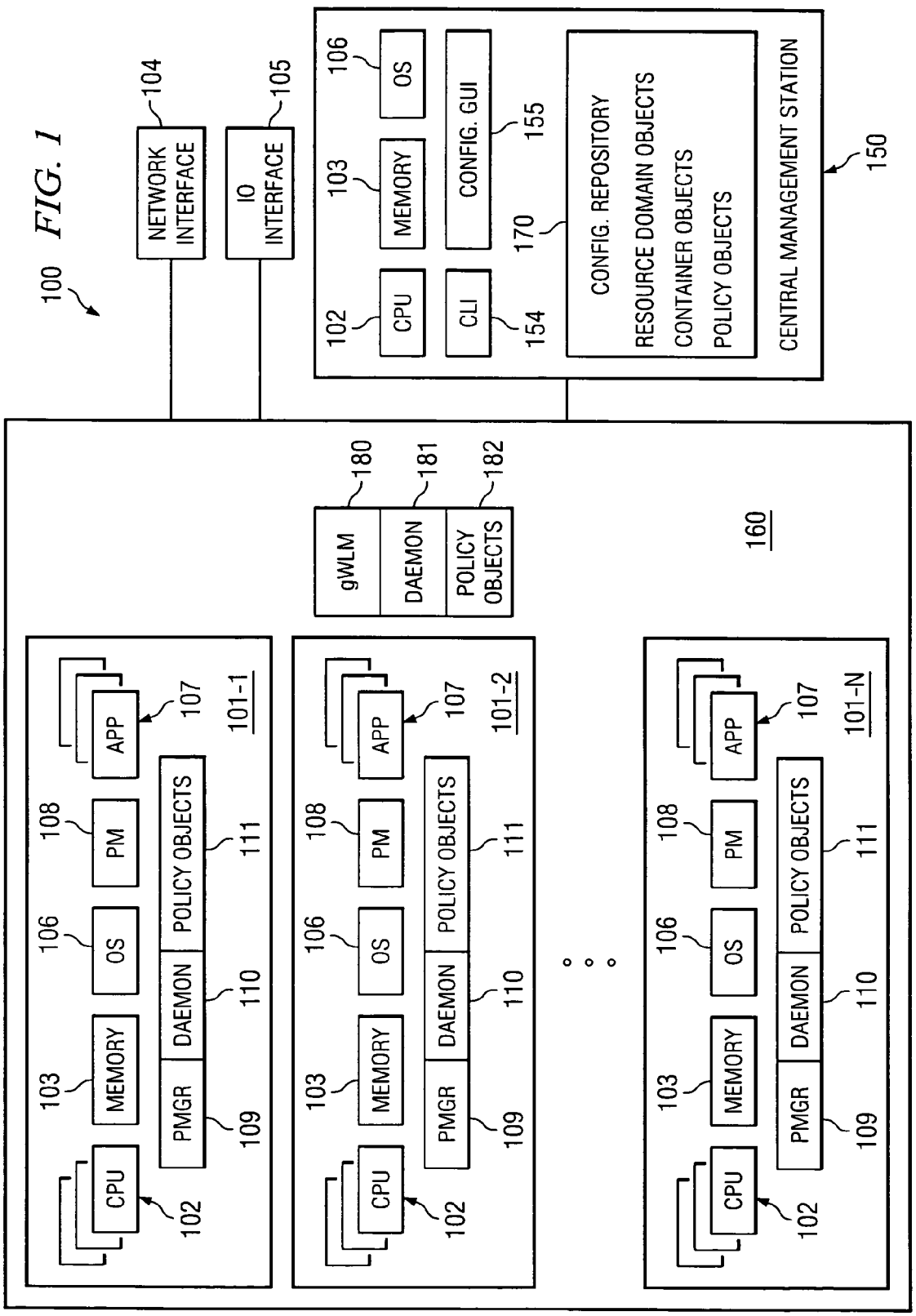
FIG. 1 depicts a system that includes workload management functionality according to one representative embodiment.

Referring now to the drawings, FIG. 1 depicts system 100 according to one representative embodiment. System 100 includes central management station 150 for performing administrative activities associated with system 100. Central management station 150 includes typical elements such as processor 102, memory 103, and operating system (OS) 106. Furthermore, central management station 150 comprises command line interface (CLI) 154 and configuration graphical user interface (GUI) 155 to perform administrative activities according to one representative embodiment. For example, central management station 150 enables resource domains 160 and partitions 101-1 through 101-N within the resource domains to be created. It is noted that only one resource domain 160 is shown for the sake of simplicity. Any number of resource domains 160 can be managed according to representative embodiments. Central management station 150 further enables workload management policies to be defined and attached to partitions 101 and/or resource domains 160.

In one embodiment, central management station 150 uses configuration repository 170 to perform these activities. Configuration repository 170 is used as a data container to hold objects. Specifically, the various objects within configuration repository 170 define resource domains 160, partitions 101, and associated workload management policies. Additionally, configuration repository 170 may be an object of a suitable class and serialized for persistent storage.

Resource domain 160 is essentially a collection of resources (e.g., processors, memory, IO capacity, storage resources, networking functionality, and/or the like) that are shared between a plurality of workloads and are, potentially, subject to reallocation between the workloads. The allocation of resources to a particular partitions 101 may be physical, i.e., a processor belongs to one and only one partition 101. Additionally or alternatively, the allocation of resources may apportion a single physical resource among multiple partitions 101 (e.g., time sharing of a processor).

Virtual partitions 101 are protective domains of resources of a server platform. Selected processors 102 and specific portions of memory 103 of the server platform may be allocated between partitions 101-1 through 101-N. Partitions 101 may share resources such as network interface 104 and input/output (IO) interface 105. Suitable queuing and scheduling mechanisms (not shown) may be used to allocate access to network interface 104 and IO interface 105 as an example. Although one representative embodiment is described as using virtual partitions, any suitable computing container may be used to implement embodiments. Specifically, any computer system having at least one resource subject to allocation may employ embodiments as described herein to determine which software processes are to receive access to the resource.

A respective operating system 106 may be executed to control the processing within each partition 101. Respective applications 107 or sets of applications are executed within partitions 101-1 through 101-N. Applications 107 may correspond to the business processes of various business units of a corporate entity, for example. The use of partitions enables a number of advantages. For example, if a software error or fault occurs within any partition 101, only that partition 101 will be affected and the other partitions 101 will continue processing without interruption.

In one embodiment, within partitions 101-1 through 101-N, performance monitors 108 are software processes that monitor operations associated with applications 107. For example, performance monitors 108 may examine the length of time required to perform selected types of transactions. Additionally or alternatively, performance monitors 108 may monitor the utilization rates associated with the processors, IO peripherals, network interfaces, or other resources by the applications 107 associated with partitions 101-1 through 101-N. The performance metrics gathered by performance monitors 108 are communicated to partition managers (PMGRs) 109.

In one embodiment, PMGRs 109 are software processes that use the performance metrics to generate resource allocation requests according to policy objects 111. The policy objects may identify policy types, target performance criteria, policy metrics, and/or the like. For example, a service level objective (SLO) may be defined to specify the desired length of time to complete a specific type of database transaction to equal one millisecond. Alternatively, an SLO may be defined to specify that the utilization rate of a resource should be maintained below 85%. The PMGR 109 determines the amount of resources needed for the SLO(s) to be obtained within a given partition 101. This amount of resources is communicated as a resource request attribute in the policy object 111. These policy objects are subsequently communicated to the global workload manager (gWLM) 180. The gWLM 180 collects policy objects 111 from each of the partitions 101-1 through 101-N and aggregates them into a set of policy objects 182 representing all partitions in the Resource Domain 160.

gWLM 180 dynamically reallocates resources between partitions 160 in response to the requests. For example, an idle processor 102 associated with partition 101-1 may be transferred to partition 101-2 in response to a request from partition 101-2. The reallocation of resources may involve reallocation of idle resources, reallocation of used resources from applications of lower priority, and/or reallocation of resources according to other suitable arbitration algorithms. Any suitable resource could be assigned in this manner such as memory, storage resources, networking resources, operating system resources, and/or the like. In one alternative embodiment, the arbitration between conflicting requests occurs according to arbitration policy objects 181.

Additionally, gWLM 180 include daemon 181 for receiving serialized policy objects 111 from central management station 150, receiving modifications of policy objects 111, and for activating previously received policy objects 111. By managing the distribution and control of policy data in this manner, workload management functionality may be modified without interruption of the workload management processes. Also, whenever a workload management policy is modified, each partition 101 and/or resource domain affected by the policy change will be autonomously updated. An administrator need not identify files within a storage hierarchy for modification. Additionally, an administrator need not identify specific workload management processes on each OS 106 to be restarted. In another embodiment, gWLM 180 also includes daemon 181 for receiving arbitration policy objects 182, modification of the objects 182, and activation of the objects 182.

Figure 2:
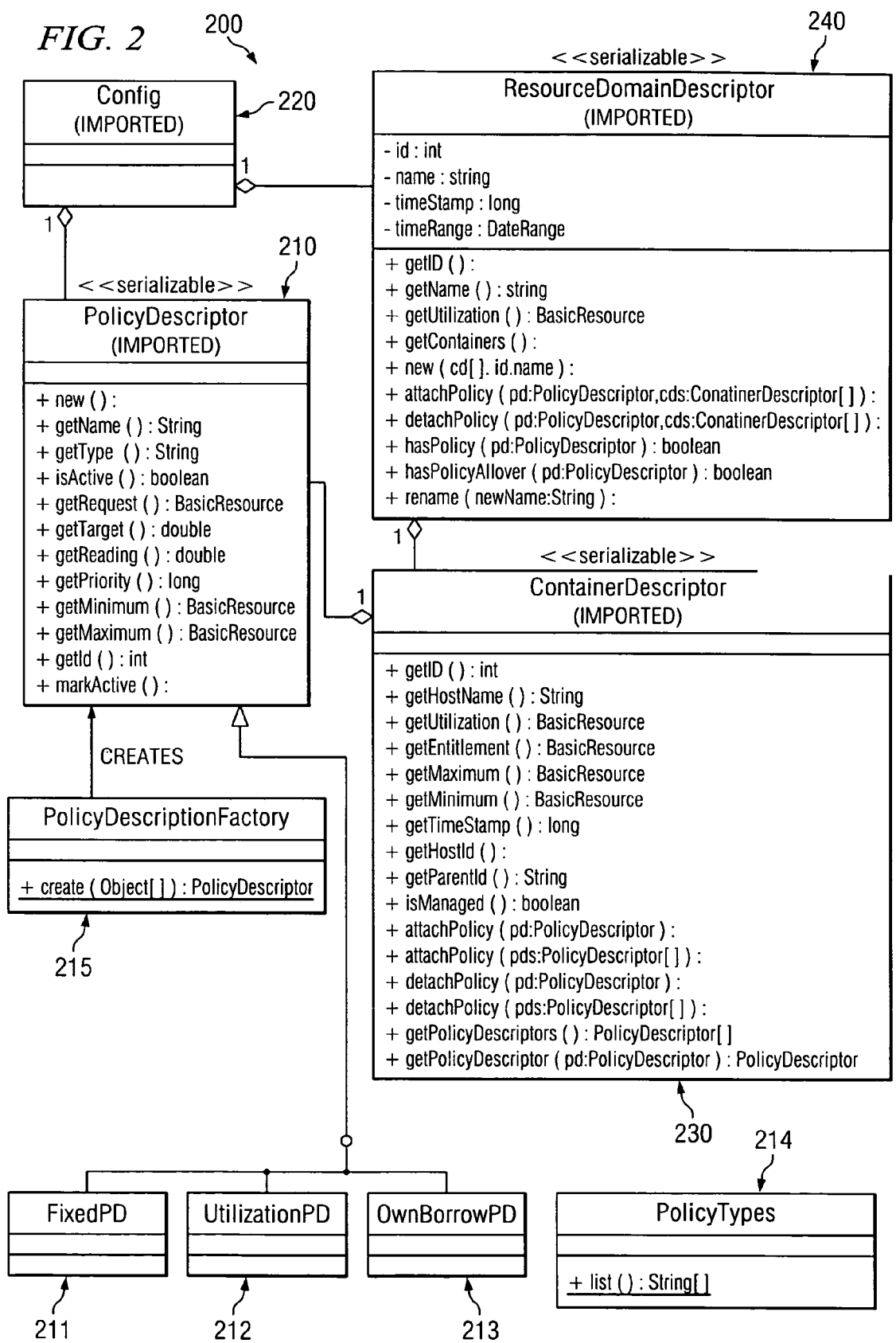
FIG. 2 depicts a plurality of classes for facilitating workload management functionality according to one representative embodiment.

FIG. 2 depicts class diagram 200 that includes various classes and related methods to facilitate management of workload management policies according to one representative embodiment. PolicyDescriptor class 210 enables policy objects to be created. ContainerDescriptor class 230 provides a means to define partitions 101 or other containers of a resource domain. ResourceDomainDescriptor class 240 similarly provides a means of defining resource domains. Config class 220 is a class that may be used as a repository to store the information relevant to the configuration of the overall system including resource domain objects, container objects, and policy objects. The relationships of a system may be maintained by defining the associations of resource domain objects to container objects and the associations of the container objects to policy objects with a Config object.

More specifically, PolicyDescriptor class 210 provides a means of specifying a policy's attributes and behavior as well as associating one or more policies to a given container. In other words, each object of PolicyDescriptor class 210 provides a definition of a policy that can be used by one or several PMGRs 109 to control workload management operations. In addition, PolicyDescriptor class 210 includes methods that can be used to monitor or characterize the state of a policy on a given partition. For example, the getReading( ) method enables the performance data associated with respective partition 101 to which a policy object is attached to be obtained. Also, PolicyDescriptor class 210 is an abstract class that may be extended to various instances of policies. For example, as shown in FIG. 2, FixedPD, UsagePD, and OwnBorrowPD classes 211, 212, and 213 extend the abstract class PolicyDescriptor class 210. In one embodiment, PolicyDescriptorFactor 215 is used to create policy objects corresponding to all the defined policy classes. PolicyDescriptorFactor 215 enables creation of a policy object having attributes set to the appropriate values in view of string identified upon the invocation of the create method.

A single PolicyDescriptor object represents the policy on every partition 101 to which it has been associated or "attached." Accordingly, modification of a policy is readily performed by modifying the appropriate attributes of the PolicyDescriptor object. Although a single PolicyDescriptor object is sufficient for defining and attaching a policy to a set of containers, multiple PolicyDescriptor objects are used for monitoring and other activities. Upon deployment or redeployment of a resource domain, a "local" copy of the PolicyDescriptor object is made for each container object. The local copies enable a container-specific state of a given policy to be available for examination using central management station 150 (see FIG. 1).

The policy objects may possess several attributes. The policy objects may include a name attribute (e.g., a string member variable) to uniquely identify a policy in a manner that is convenient for administrators. The attributes may include resource variables such as minimum or maximum resources to be allocated. The attributes may include a performance target (goal or service level objective). The attributes may include one or several "readings" that reflect a container state or performance metric at a given point in time. The reading attributes are used when the policy objects are attached to specific partitions 101.

The attributes include a policy type as defined using PolicyTypes class 214. Each policy type corresponds to a unique workload management algorithm. PolicyTypes class 214 provide constant labels for each policy and a list method( ) that returns the list of labels. For example, a policy type may be defined for fixed allocation policies (a respective partition 101 is statically assigned a predetermined number of processors), "share" policies (each respective container receives a percentage or fractional amount of available resources), "borrow" policies (resources may be temporarily transferred between partitions 101 in response to utilization rates), "owned/borrow" policies, and/or the like.

Owned/borrow algorithms enable idle or underutilized resources to be transferred between partitions 101 in response to requests from "underperforming" partitions 101. However, when a partition 101 that has "lent" resource subsequently so requires, the partitions 101 can immediately reclaim lent sources up to its "owned" amount. Further details regarding owned/borrow algorithms are disclosed in co-pending U.S. patent application Ser. No. 11/007,360, entitled "SYSTEM AND METHOD FOR ALLOCATING A RESOURCE IN A COMPUTER SYSTEM," filed Dec. 8, 2004, which is incorporated herein by reference. In one embodiment, each partition 101 in a resource domain possesses an owned/borrow policy when the owned/borrow allocation is utilized. In this embodiment, illegal attachment of policies are detected and prevented before deployment of such policies to partitions 101.

In one embodiment, a controller (e.g., a method called by PMGR 109) is defined for each policy type. The controller uses a target and one or several readings to determine whether additional resources would be beneficial. If so, the controller communicates a suitable signal to gWLM 180 to obtain additional resources (e.g., one or several processors). Similar operations may occur to deallocate or otherwise make available idle or underutilized resources.

Also, the policy objects may further include a boolean member variable to indicate whether a policy is active. The purpose of the boolean member variable is to enable multiple policy objects to be attached to a single partition 101. When a policy object is attached to a container and the boolean member variable is set to the appropriate value, the corresponding controller is used to generate resource requests to gWLM 180. One possible advantage of enabling multiple policies to be attached to a container is the ability to change allocation behavior in an expeditious and efficient manner. For example, a given workload may only require significant resources at limited periods of times. When one of those periods arrives, an event may be triggered to activate a policy on the container supporting the workload. The activated policy may provide for greater resource requests than otherwise would occur during periods of low demand. Thus, a time-dependent workload management may be implemented in an efficient manner according to some representative embodiments.

Config class 220 may comprise a plurality of methods that facilitate operations associated with policy domain objects. For example, the attach and detach methods enable policy objects to be attached to ContainerDescriptor objects (see ContainerDescription class 230). ContainerDescriptor objects and resource domain description objects (see RDD class 240) include similar attach and detach methods to enable attachment and detachment operations to occur on several levels of granularity. Also, the getPolicyDescriptor( ) method (see ContainerDescription class 230) may be used to return an array of the policies currently attached to a container.

FIG. 3 depicts a flowchart for creation of a policy object according to one representative embodiment. In step 301, the user selects one of a plurality of policy types. In step 302, a policy object corresponding to the selected policy type is instantiated. In step 303, the user may enter one or several attributes that define the operation of the policy. The attributes may include minimum or maximum resources for allocation, an "owned" amount of resources, shares of resources, and/or the like. Some of the attributes may be initially presented to the user with default values. Also, some of the less frequently changed attributes may be presented via an "advanced" tab of the GUI. When the user is satisfied with attribute values, the user saves the policy using a policy name (step 304). When the user saves the policy, the policy object may be added to configuration repository 170. The saved policy is then available to control workload management operations associated with the containers. Although the user may create policies according to the specific needs of the user's applications, some representative embodiments may store predefined policies in configuration repository 170 for user selection. For example, some representative embodiments may incorporate workload management functionality within an operating system. Pre-defined policies may be shipped with the operating system to enable workload management to be initiated with minimal operations required of the administrator.

FIG. 4 depicts a flowchart for attaching a policy to a container according to one representative embodiment. In step 401, a list of available policies (as defined in configuration repository 170) is provided to the user for selection. In step 402, a list of resource domains is presented to the user for selection. In response to user selection of a resource domain, a list of containers of the selected resource domain is presented to the user (step 403). In step 404, the user selects one or several containers for attachment. In step 405, a logical comparison is made to determine whether the attachment is legal according to predefined rules. If the attachment is illegal, a suitable error message is provided to the user (step 406). If the attachment is legal, the container objects in configuration repository 170 associated with the selected containers are updated to reflect the attachment (step 407). Also, to provide "local" copies of the policy object, serialization of the policy object is used to communicate the policy to PMGR daemons 110 (step 408) of the selected containers. Policies may be detached from partitions 101 in a similar manner.

FIG. 5 depicts a flowchart for activating workload management functionality according to one representative embodiment. In step 501, a list of resource domains is presented for selection by a user. Upon selection of a resource domain, a list of partitions 101 of the resource domain is presented for selection (step 502). In step 503, a list of policy objects attached to the selected container(s) 101 is presented for user selection. In step 504, an attribute of the selected policy object(s) is set to the appropriate value and, if another policy object was previously activated, the attribute of the other policy object(s) is set to a deactivated value. In step 505, a suitable message is communicated to the respective daemon(s) 110 to activate the selected policy. In step 506, one or several daemons 110 set the values of the local policy objects appropriately and one or several PMGR 109 begin workload management operations according to the activated policy object.

FIG. 6 depicts a flowchart for modification of a policy object according to one representative embodiment. In step 601, a list of policy objects is presented to the user. In step 602, the user may modify one or several attributes that define the operation of the respective policy. When the user is satisfied with attribute values, the user saves the policy (step 603). When the user saves the policy, configuration repository 170 is updated to reflect the modification. When the policy is saved, each container to which the policy is attached is automatically identified (step 604). The policy object is serialized and communicated to each identified PMGR daemon 110 (step 605). The respective PMGRs 109 then adjust their workload management operations and controller definitions using the modified policy objects.

In addition to managing workload management policies through a user interface, some representative embodiments may provide an application programming interface (API), set of operating system calls, or other routines to enable management of workload management policies to occur through software programs. For example, it may be convenient to implement software programs that dynamically activate and deactivate policy objects according to a predefined schedule to coordinate business processes.

What is claimed is:

1. A system, comprising:
   a plurality of computing containers, each of said computing containers having processing resources for executing software workloads;
   a plurality of management processes for controlling access to said processing resources according to a plurality of workload policy definitions, each of said plurality of workload policy definitions having at least one attribute defining an amount of a resource for allocation to a computing container;
   a data container for storing said plurality of workload policy definitions and associations between said plurality of workload policy definitions and said plurality of computing containers; and
   a configuration process for communicating said plurality of workload policy definitions from said data container to said plurality of management processes, said configuration process being operable to autonomously communicate updated workload policy definitions to said plurality of management processes upon modification.

2. The system of claim 1 further comprising:
   a user interface process for managing said plurality of workload policy definitions.

3. The system of claim 1 wherein a user interface process is operable to receive input from a user to create said plurality of workload policy definitions.

4. The system of claim 2 wherein said user interface process receives input from a user to modify previously stored ones of said plurality of workload policy definitions.

5. The system of claim 1 wherein each of said plurality of workload policy definitions identifies one of a plurality of workload management algorithms.

6. The system of claim 1 wherein said amount represents a share of a total amount of available processor resources.

7. The system of claim 1 wherein said amount represents a minimum amount of processor resources.

8. The system of claim 1 wherein said amount represents a maximum amount of processor resources.

9. The system of claim 1 wherein said amount represents an amount of processor resources subject to immediately reclamation by a computing container.

10. The system of claim 1 wherein said plurality of management processes maintain at least one container-specific attribute of said plurality of workload policy definitions.

11. The system of claim 10 wherein said container-specific attribute stores utilization information associated with a respective computing container.

12. A method, comprising:

maintaining a data container that includes a plurality of computer container definitions, a plurality of workload management definitions, and associations between said plurality of computing container definitions and said plurality of workload management definitions;

operating a plurality of management processes for performing resource allocation operations associated with a plurality of computing containers instantiated according to said plurality of computer container definitions, wherein said resource allocation operations are performed according to each of said plurality of workload policy definitions having at least one attribute defining an amount of a resource for allocation to each of said plurality of computing container; and communicating changes to said plurality of workload management definitions in said data container to said plurality of management processes, wherein said step of communicating changes autonomously occurs to communicate updated workload policy definitions to said plurality of management processes upon modification.

13. The method of claim 12 further comprising:
communicating changes to said associations in said data container to said plurality of management processes.

14. The method of claim 12 wherein said associations include an association linking a single workload policy definition to multiple computer container definitions.

15. The method of claim 12 wherein said plurality of workload management definitions include administrator created definitions.

16. The method of claim 12 wherein said plurality of workload management definitions include default definitions.

17. The method of claim 12 further comprising:
receiving data indicating that activation of an identified workload management definition on at least one computer container; and
communicating a message to a management process associated with said computer container to begin allocation resource operations according to said identified workload management definition.

18. The method of claim 12 wherein each of said plurality of workload management definition identifies one of a plurality of workload management algorithms.

* * * * *